Feb. 27, 1968  W. K. SONES  3,371,343
AUTO COHERENT PHASE CODING APPARATUS
Filed Jan. 10, 1967  2 Sheets-Sheet 1
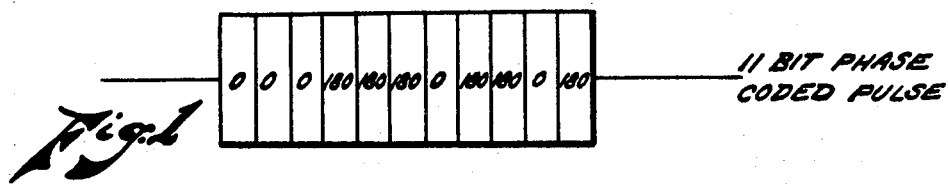
Fig. 1  11 BIT PHASE CODED PULSE
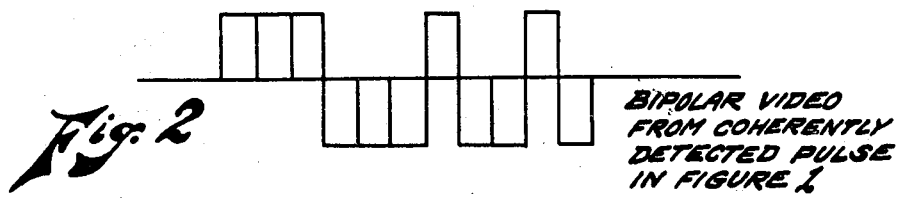
Fig. 2  BIPOLAR VIDEO FROM COHERENTLY DETECTED PULSE IN FIGURE 1
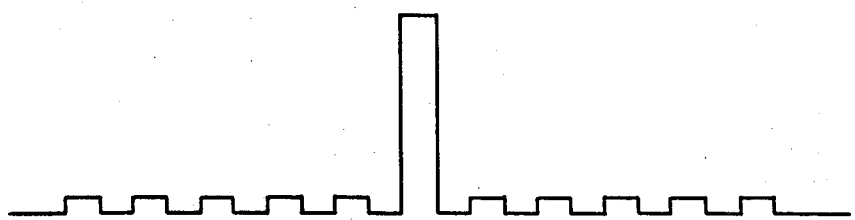
Fig. 3  SAMPLED AUTO CORRELATION FUNCTION ON DECODED OUTPUT BIPOLAR PULSES IN FIGURE 2
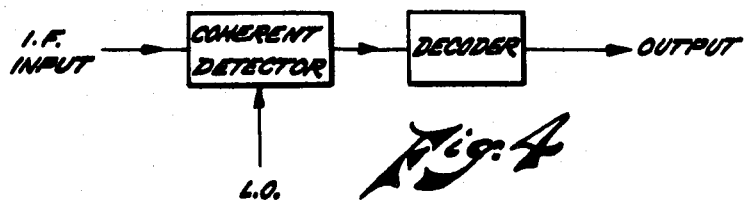
Fig. 4
INVENTOR.
WILLIAM K. SONES
BY
Norbert E. Farmer
ATTORNEYS

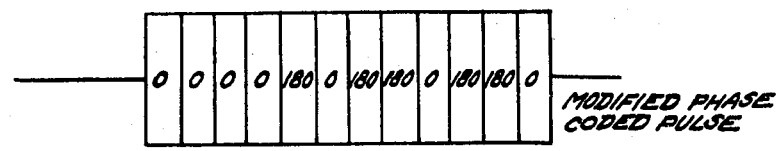
Fig. 5 — MODIFIED PHASE CODED PULSE
Fig. 6
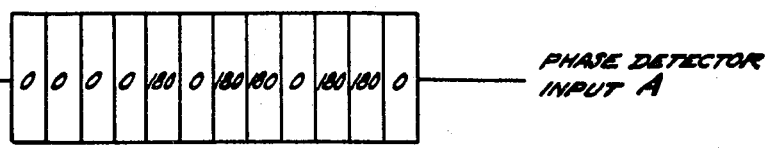
Fig. 7a — PHASE DETECTOR INPUT A
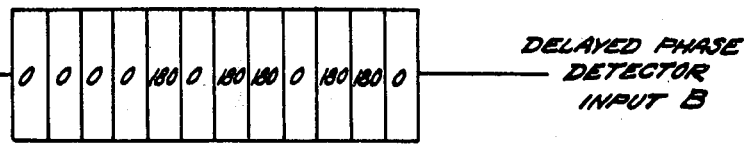
Fig. 7b — DELAYED PHASE DETECTOR INPUT B
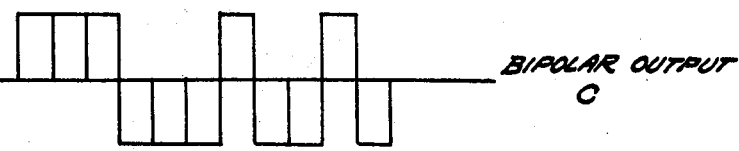
Fig. 7c — BIPOLAR OUTPUT C
INVENTOR.
WILLIAM K. SONES
BY
Herbert C. Jarmer
ATTORNEYS

United States Patent Office 3,371,343
Patented Feb. 27, 1968

3,371,343
AUTO COHERENT PHASE CODING APPARATUS
William K. Sones, Baltimore, Md., assignor, by mesne assignments, to the United States of America as represented by the Secretary of the Air Force
Filed Jan. 10, 1967, Ser. No. 608,453
2 Claims. (Cl. 343—17.2)

ABSTRACT OF THE DISCLOSURE

An auto coherent phase coding circuit for connecting a source of received echo signals from radar transmission consisting of a series of wide coded pulses, to a decoder unit, including means for modifying coded pulses, a phase detector and delay means wherein the pulses from the output of said phase detector means are decoded and the original wide pulse is collapsed into a narrow pulse with an accompanying increase in effective peak signal.

---

This invention relates generally to pulse compressed radar transmitter circuits, and more particularly, to a circuit which increases effective peak transmitted power when the transmitter is peak and not average power limited.

In order to achieve an increase in effective peak transmitted power, various prior art pulse compression methods have been demonstrated, where a wide pulse is transmitted on a carrier which is either frequency or phase coded. On reception, the long pulse is decoded in such a manner as to collapse the pulse to a narrow one with an accompanying increase in effective peak signal.

In application, it is necessary to detect the coded pulse return from a target having unknown range and velocity, and consequently, unknown carrier phase and Doppler frequency shift. The unknown carrier phase can be overcome by coherently decoding at IF and then envelope detecting. However, the Doppler frequency shift, for targets with presently encountered velocities, can cause considerable degradation in the process of decoding during which the phase reversals must be removed. To accomplish this decoding, fixed phase shifts are introduced which are only accurately 180 degrees at center frequency, and any displacement from this due to Doppler causes an error and degradation of the reconstituted narrow pulse.

Accordingly, it is an object of this invention to provide improved auto coherent phase coding apparatus which increases the effective peak transmitted power when the radar transmitter is peak limited.

Another object of this invention is to provide auto coherent phase coding apparatus which cancels the effect of Doppler frequency shifts on the decoding of a wide frequency pulse.

And still another object of this invention is to provide auto coherent phase coding apparatus which cancels the effect of Doppler frequency shifts on the reconstituted narrow pulse and thereby increases the effective peak signal.

The foregoing objects and others which may appear from the following detailed description are attained by modifying an original 11 bit bipolar video code into a 12 bit coded pulse, which when phase detected against itself, displaced by one time increment, produces the original 11 bit code which can then be decoded in the normal way. In this manner, when the Doppler frequency remains constant over the period of one bit, the effects of Doppler cancel.

A better understanding of the invention may be had by referring to the following detailed description of an embodiment of the invention taken in conjunction with the accompanying drawings, wherein:

FIGURE 1 illustrates a typical 11 bit phase coded pulse;

FIGURE 2 illustrates the bipolar video train obtained when the pulse shown in FIGURE 1 is coherently detected;

FIGURE 3 illustrates the pulse train output obtained when the bipolar train of FIGURE 2 is decoded;

FIGURE 4 is a block diagram of how the bipolar video train of FIGURE 2 is obtained;

FIGURE 5 illustrates the modified phase coded pulse;

FIGURE 6 is a block diagram of how the modified phase coded pulse is phase detected against itself displaced by one time increment;

FIGURE 7a illustrates the phase detector input;

FIGURE 7b illustrates the delayed phase detector input; and

FIGURE 7c illustrates the bipolar output to the decoder.

Now referring to the drawings, a simple means of achieving the coding of a wide pulse transmitted on a carrier, is to transmit a pulse $\omega$ times the length $\tau$ of the required pulse, but with the carrier phase coded by phase reversals according to a desired code. A typical phase reversal coded pulse is shown in FIGURE 1 for an 11 bit code. It is to be noted that $\eta$ order codes can be devised such that their auto correlation function has a peak value of $\eta$ and a time sidelobe level with equal peak values not exceeding unity. When the coded pulse shown in FIGURE 1 is coherently detected (as shown in FIGURE 4), the bipolar video train shown in FIGURE 2 is obtained. Decoding (FIGURE 4) this bipolar video pulse train yields the output shown in FIGURE 3; namely, a narrow reconstructed pulse equivalent to eleven times the height of each individual bit and only one-eleventh as wide.

To detect the coded pulse return from a target having unknown Doppler frequency shift which causes considerable degradation in the process of decoding in which the phase reversals must be removed, the modified phase coded pulse shown in FIGURE 5 is used. The 12 bit coded pulse shown in FIGURE 5, when phase detected against itself displaced by one time increment $\tau$ as shown in FIGURE 6, produces the original 11 bit bipolar video code which can then be decoded in the conventional manner. FIGURES 7a, b and c show for FIGURE 6 the phase detector input A, the delayed phase detector input B, and the bipolar output C to the decoder, respectively. It is evident that provided the Doppler frequency remains constant over the period of one bit, the effects of Doppler cancel.

Therefore, while a single embodiment of the invention has been shown and described, it is to be understood that the invention is not limited thereto but contemplates such modifications, for example, similar modified codes and pulse coding schemes to reduce the radar cell and improve detectability in extended clutter and chaff, and further embodiments utilizing various changes in form and details that will occur to those skilled in the art without departing from the spirit and scope of the invention.

I claim:

1. An auto coherent phase coding circuit for connecting a source of received echo signals from radar transmission of a series of wide, coded pulses to a decoder unit, comprising, means for modifying said coded pulses, phase detector means, a direct path from said source of modified coded pulse signals to said phase detector means, a delay path from said source of modified coded signals to said phase detector means and connected in parallel with said direct path, delay means interposed in said delay path for delaying said modified coded pulse signals, means in said phase detector means whereby said modified coded pulse when phase detected against itself produces the original series of coded pulses free of any Doppler frequency shift effects, and an output path from said phase detector means to said decoder unit whereby when the pulses from the output of said phase detector means are decoded said original wide pulse is collapsed into a narrow pulse with an accompanying increase in effective peak signal.

2. The circuit as described in claim 1 wherein said delay means comprises means for delaying said modified coded pulses by one time increment.

No references cited.

RODNEY D. BENNETT, *Primary Examiner.*

J. P. MORRIS, *Assistant Examiner.*

Disclaimer 3,371,343.—*William K. Sones*, Baltimore, Md. AUTO COHERENT PHASE CODING APPARATUS. Patent dated Feb. 27, 1968. Disclaimer filed March 19, 1973, by the assignee, *the United States of America, as represented by the Secretary of the Air Force.*

Hereby enters this disclaimer to claims 1 and 2 of said patent.

[*Official Gazette April 17, 1973.*]